Patented Nov. 6, 1923.

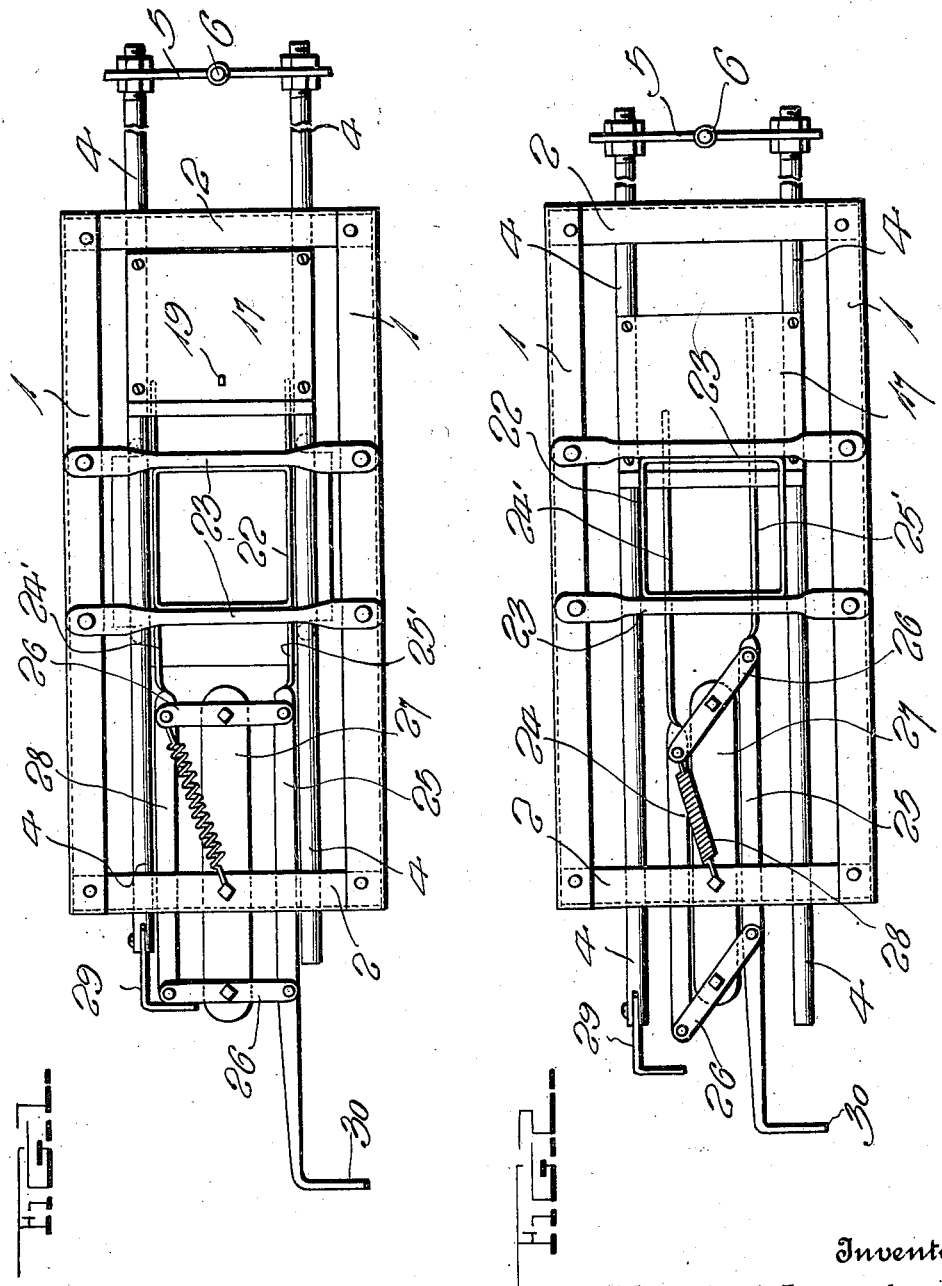

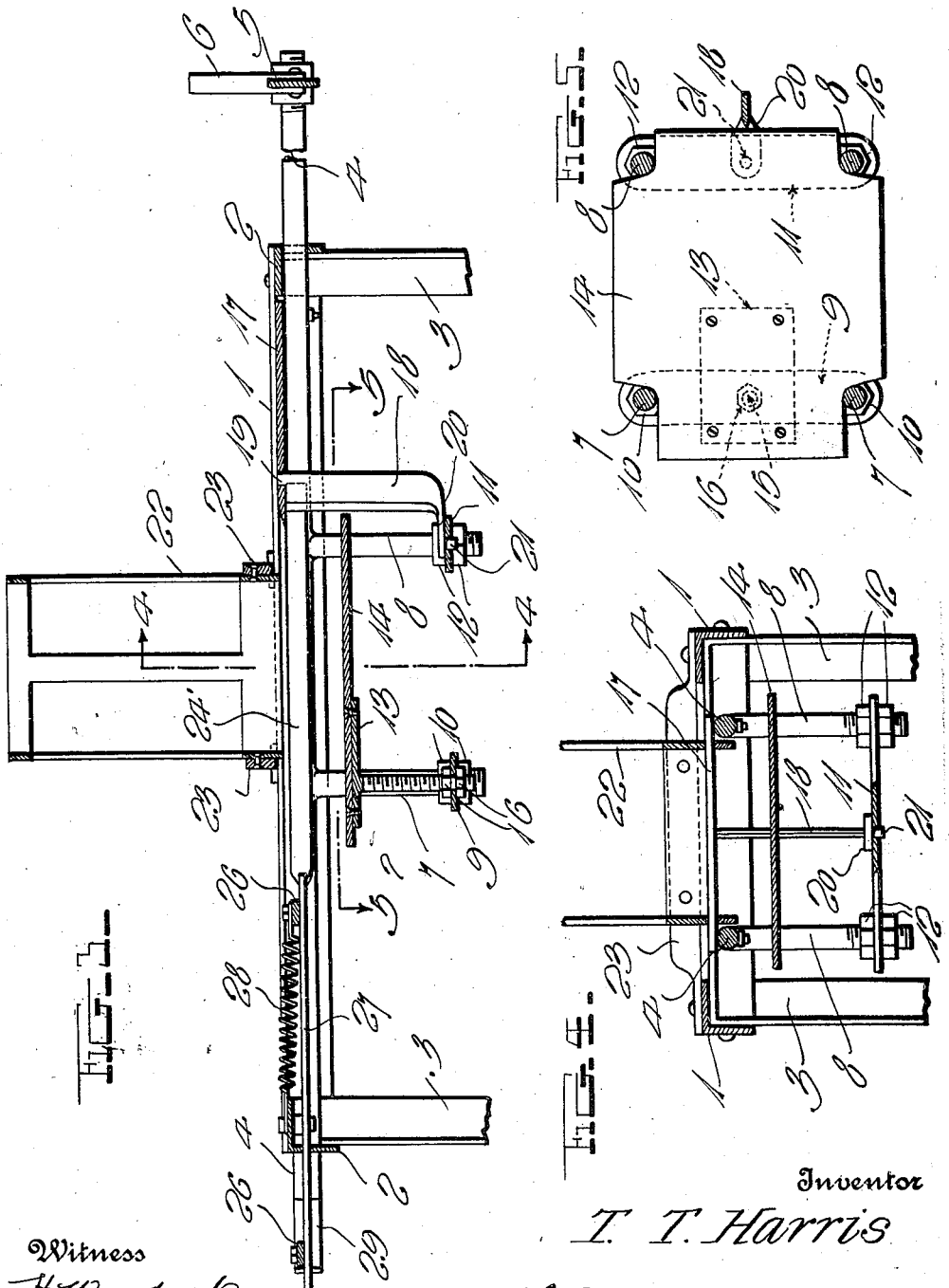

1,473,553

UNITED STATES PATENT OFFICE.

THOMAS T. HARRIS, OF ROANOKE, VIRGINIA.

MACHINE FOR CUTTING BRICK ICE CREAM.

Application filed May 18, 1922. Serial No. 561,986.

*To all whom it may concern:*

Be it known that I, THOMAS T. HARRIS, a citizen of the United States, residing at Roanoke, in the county of Roanoke and State of Virginia, have invented certain new and useful Improvements in Machines for Cutting Brick Ice Cream; and I do declare the following to be a full, clear, and exact description of the invention, such as will enable others skilled in the art to which it appertains to make and use the same.

This invention relates to a machine for cutting brick ice cream into pieces and one object of the invention is to provide a machine so constructed that a brick of ice cream may be cut into a number of pieces all of which will be of the same size and to further so construct this machine that a brick of ice cream may be properly centered to permit a slice cut from the lower end of a block of cream to be evenly divided while the slice is being cut from the block.

Another object of the invention is to so construct this machine that a table which supports the lower end of the block of cream may be adjusted vertically and thus permit the slabs cut from the lower end of the block to be cut at the desired thickness.

Another object of the invention is to so construct this machine that the supporting table and cutting knife for cutting off the slab from the lower end of the block of cream may be carried by side bars of the moving table thereby permitting the block to be supported by the cutting knife as the knife moves through the block and the table moves from beneath the block and to permit the block to drop onto the table after the cutting knife has returned to its initial position.

Another object of the invention is to so construct this machine that the means for gripping and centering the block of ice cream may be normally held in an operative position and moved to an inoperative position by the side bars of the carriage when the carriage moves.

This improved ice cream cutting machine is illustrated in the accompanying drawings, wherein:

Figure 1 is a top plan view showing the machine in position ready to start cutting and the cream centering and gripping means shown in an inoperative position.

Figure 2 is a view similar to Fig. 1 showing the carriage partially moved in its cutting stroke and the ice cream gripping and centering means in an operative position.

Figure 3 is a longitudinal sectional view through the improved ice cream cutting machine.

Figure 4 is a vertical transverse sectional view taken along the line 4—4 of Fig. 3.

Figure 5 is a horizontal sectional view taken along the line 5—5 of Fig. 3.

This improved machine is provided with a frame or table having side strips 1, end strips 2 and supporting legs 3. These side and end strips and supporting legs are formed of angle iron and are put together and secured at the corners by bolts or other suitable fasteners. This frame or table slidably supports a carriage which is provided with side bars 4 connected by a cross strip 5 at their forward ends. This cross strip 5 carries a handle 6 so that the carriage may be readily moved longitudinally. The side bars 4 of this carriage extend through the depending flanges of the end strips 2 and each is provided with depending arms 7 and 8 intermediate its length. The arms 7 are connected by a cross strip 9 held in place by securing nuts 10 and the arms 8 are connected by a cross strip 11 held in place by securing nuts 12. A supporting bracket 13 which carries a plate or table 14 is provided with a threaded stem 15 which passes through the cross strip 9 and carries securing nuts 16 so that the table may be secured at the desired position beneath the cutting knife 17 secured upon the upper faces of the side bars 4. Therefore, the block of ice cream to be cut into pieces may be supported with its lower end a predetermined distance beneath the cutting edge of the blade 15 and when the carriage is moved longitudinally of the frame or table, the slice cut from the lower end of the block of ice cream will be of a desired thickness. It is further desired to permit the cut slice of cream to be divided and therefore there has been provided a vertically disposed cutting knife 18 which has its upper end provided with a pin extension 19 which fits into a slot formed in the blade 17 and has its lower end portion bent to provide an arm extension 20 provided with a pin 21 for fitting into a slot formed in the cross strip 11. When it is desired to remove or insert the blade 18, it is simply necessary to release the lower securing nuts 12 and the cross strip can then be dropped so that the vertical knife can be put in place. The cross strip can then be moved to the proper position to engage the tongue 21 and the lower securing nuts screwed tightly into engagement with the cross strip. It is of course understood that if desired more then one vertical knife could be provided thus permitting the slice cut from the lower end of the block of ice cream to be cut into more than two pieces. The block of ice cream which is to be cut into pieces will be placed in a frame 22 which is formed of strips as shown and open at its upper and lower ends. This frame has its lower end portion connected with cross bars 23 which extend from one side bar 1 to the other and are secured to these side bars as shown in Figs. 1 and 2. From an inspection of Figs. 3 and 4, it will be readily seen that the block of ice cream placed in the frame may rest upon the moving table and have its lower end portion cut through by the moving blade 17. It will be further noted that as the blade 17 cuts through the ice cream, the uncut block will rest upon the cutting blade 17 and will be held in this position until the blade has returned to approximately its initial position. As the blade 17 moves from beneath the uncut block, this block will drop upon the moving table 14 where it will be supported. It will thus be seen that the block of ice cream can be cut into pieces of the desired size so that the cut pieces may be either served as cut, wrapped up for delivery, or dipped in an edible coating preferably formed of chocolate.

When the block of ice cream is in place, it is desired to have it properly centered so that the slice cut from its lower end may be properly divided by the vertically disposed knife 18 and therefore there has been provided arms 24 and 25 which are positioned between the bars 4 and have their inner end portions turned to provide vertically disposed blades 24' and 25'. These blades 24' and 25' extend upon opposite sides of the block of ice cream and when they engage the block of ice cream, they will have a tendency to properly center the block upon the table 14 so that the slice cut from its lower end will be slit into two pieces of the proper size. These blades have their handle portions pivotally connected with links 26 pivotally carried by a supporting strip 27 and since one of the links is engaged by a spring 28, the blades will be normally drawn towards each other but may be caused to move apart when either of the strips 24 and 25 is moved longitudinally. In order to move the strip longitudinally, one of the side bars 4 has been provided with a hook 29 for engaging the end of the strip 24 and the strip 25 has been extended beyond the outer end of the strip 24 and has its free end portion provided with a side arm 30 for engagement by the end of the second side bar 4. When the cutting blade 17 is moved to the position shown in Fig. 1, the hook 29 will engage the end of the strip 24 and move this strip longitudinally thus causing the blades to be moved apart. This permits the block of ice cream to settle properly upon the table 14. The handle 6 is now grasped and moved to force the side bars 4 forwardly. As these bars move forwardly, the hook 29 moves out of engagement with the strip 24 and the spring 28 will draw the blade into engagement with the sides of the block of cream. The blade 17 cuts through the lower end portion of this block of cream and the blade 18 splits the slice. This pressure against the block of ice cream does not however prevent the slice from being cut into by the blade 18 but is sufficient to prevent the split portions breaking off and dropping before the entire slice has been split. After the blade 18 has passed through the slice, the second side bar will engage the side arm 30 of the strip 25 and move this strip to swing the links 26 and move the blades apart so that the sections formed by the split slice may drop into a suitable receptacle. The carriage is then drawn back towards its original position and when the side bar moves out of engagement with the side arm 30, the blades will return to the position shown in Fig. 2. The blades remain in the position shown in Fig. 2 until the carriage has been moved rearwardly a sufficient distance to bring the hook into engagement with the strip 24 again and move the blades apart to permit the block of ice cream to again settle properly upon the table 14. It will thus be seen that the block of ice cream may be easily and quickly cut into pieces of the desired size and that the slices can be cut at the desired thickness through adjustment of the table 14 to position it the necessary distance beneath the blade 17.

While the machine specifically illustrated is hand-operated, it is to be understood that if desired power operated means may be provided to slide the carriage back and forth. It is to be further understood that if desired the frame portion may be formed of material other than the angle iron strips shown and described.

I claim:

1. An ice cream cutting machine comprising a body structure, a carriage movable longitudinally of the body structure and including side bars slidably carried by the body structure, a horizontally disposed slicing knife carried by and extending between the side bars, depending arms carried by the side bars, cross strips carried by the arms, a vertically disposed slicing knife having its upper end connected with the horizontally disposed slicing knife and having its lower end portion connected with the strip carried by one set of depending arms, a support having a threaded stem passing through the other cross strip and having securing nuts above and below said cross strip for permitting vertical adjustment of the support, a table forming plate carried by said support for supporting a block of ice cream to be spliced, an open-ended carrier for a block of ice cream being carried by said body structure, said table plate being positioned beneath the vertically disposed cream holding frame when the horizontal cutting blade is in front of the same, ice cream gripping strips extending longitudinally of the body structure, links pivotally mounted between the gripping strips and extending transversely thereof and having their end portions pivotally connected with the gripping strips, resilient means engaging one of said links to normally hold the links turned diagonally of the body portion with the gripping strips moved towards each other, one of said strips having its free end portion provided with a side arm for engagement by one of the side bars of said carriage when the carriage is moved longitudinally, the other side bar of said carriage having means at its free end for engaging the second gripping strip and moving the gripping strip to an inoperative position when the carriage is in initial position.

2. An ice cream cutting machine comprising a body portion, a carriage slidable longitudinally thereof and having side bars slidably carried by said body portion, a vertically disposed open-ended cream holding frame intermediate the length of said body portion, depending arms carried by said side bars, cross strips carried by the depending arms, a horizontally disposed cutting blade carried by and extending between the side bars, a vertically disposed cutting blade having its upper end portion connected with the horizontal blade and its lower end portion connected with the forward one of said cross strips, a support having a stem portion secured to the rear one of said cross strips for vertical adjustment, a cream supporting plate carried by said support and positioned beneath the cream holding frame when the cutting blades are positioned in front of the frame, and means to facilitate movement of said carriage longitudinally of the body.

3. An ice cream slicing machine comprising a body, a carriage slidably carried by said body, a cutting knife carried by said carriage, a cream support carried by said carriage, cream gripping means carried by said body and movable into and out of an operative position and yieldably held in an operative position, said gripping means being engageable by said carriage for permitting said gripping means to be moved to an inoperative position by said carriage.

4. An ice cream slicing machine comprising a body, a carriage slidable longitudinally of the body, a horizontally disposed cutting knife carried by said carriage, a cream support carried by the carriage to the rear of the cutting knife and vertically adjustable, cream gripping means carried by said body and movable into and out of an operative position and yieldably held in an operative position, said gripping means being engageable by said carriage for permitting said gripping means to be moved to an inoperative position by said carriage.

5. The structure of claim 4, having the gripping means movable to an inoperative position by said carriage at either end of the extremity of the movement of the carriage longitudinally of said body.

6. The structure of claim 4 having the gripping means consisting of strips extending longitudinally of the body, links pivotally mounted between the strips and having their end portions pivotally connected therewith, resilient means engaging one of the links for turning the same and normally holding the strips drawn toward each other, a side extension carried by said carriage for engaging one of the strips to move the gripping strips to an inoperative position when the carriage is drawn forwardly, and a side extension extending from the second strip for engagement by said carriage to move the strips to an inoperative position when the carriage is moved rearwardly to approximately its full extent.

In testimony whereof I have hereunto set my hand.

THOMAS T. HARRIS.